United States Patent [19]

Blankenship

[11] Patent Number: 5,361,688
[45] Date of Patent: Nov. 8, 1994

[54] COMBINATION NUT CRACKER AND NIBBLER

[76] Inventor: Fred E. Blankenship, 1124 Castlerock Dr., Shepherdsville, Ky. 40165

[21] Appl. No.: 83,645

[22] Filed: Jun. 25, 1993

[51] Int. Cl.$^5$ .............................................. A23N 5/00
[52] U.S. Cl. ........................................ 99/572; 99/581; 30/120.4; 30/120.5
[58] Field of Search ............... 30/120.1, 120.2, 120.3, 30/120.4, 120.5; 99/571, 572, 573, 574, 575, 581

[56] References Cited

U.S. PATENT DOCUMENTS

| | | | |
|---|---|---|---|
| 508,355 | 11/1893 | Streeter et al. | 30/120.3 |
| 1,312,149 | 8/1919 | Zaljs | 30/120.3 |
| 1,499,653 | 7/1924 | Hagadorn | 99/581 |
| 4,009,651 | 3/1977 | Adams | 30/120.3 |
| 4,145,962 | 5/1979 | Coleman et al. | 99/581 |
| 4,383,479 | 5/1983 | Hill | 30/120.1 |
| 4,612,854 | 9/1986 | Chiro | 99/581 |

FOREIGN PATENT DOCUMENTS

| | | | |
|---|---|---|---|
| 2585553 | 2/1987 | France | 30/120.2 |
| 0517600 | 1/1931 | Germany | 99/581 |
| 0009434 | of 1890 | United Kingdom | 30/120.5 |

*Primary Examiner*—Eugenia Jones
*Assistant Examiner*—Allan M. Schrock
*Attorney, Agent, or Firm*—Scott R. Cox

[57] ABSTRACT

A combination nut cracker and nibbler comprised of an upper moveable jaw, a lower fixed jaw, a front pivot arm secured to the lower fixed jaw, a lever arm secured to the front pivot arm and the upper moveable jaw, a back arm secured to the upper moveable jaw and the lower fixed jaw and a screw threaded shank nibbler secured to the upper moveable jaw.

15 Claims, 3 Drawing Sheets

COMBINATION NUT CRACKER AND NIBBLER

BACKGROUND OF INVENTION

1. Field of Invention

This invention relates to nut crackers. More specifically, this invention discloses a nut cracker which contains as an integral element a nibbler for providing selective cracking pressure for difficult to crack nuts.

2. Prior Art

Nut crackers of all shapes and sizes have been created for many years. Because the shell of a nut is usually much harder than the nut meat, care must be taken when cracking the shell so as not to break or shatter the meat. It is thus important in the cracking of the nut that sufficient force be applied to the nut to crack the nut's shell without shattering the meat contained within the nut.

A significant number of nut cracker mechanisms using lever arrangements have been disclosed which permit the application of pressure to the nut shell while attempting not to shatter the meat contained therein. For example, U.S. Pat. No. 1,499,653 discloses a nut cracker with conventional upper and lower jaws for cracking the nut which uses a pivoting lever mechanism to increase the amount of force that can be applied to the nut being cracked. Other such levered nut crackers are disclosed, for example, in U.S. Pat. Nos. 4,173,825, 1,543,797 and 1,693,493.

Instead of a levered mechanism for the cracking of nuts, there have also been disclosed devices for cracking nuts comprised of a fixed jaw and a screw-threaded shank. Such a device is disclosed in U.S. Pat. No. 4,145,962.

In addition, a device used for the cracking of nuts which contains a levered mechanism and a flat head with a number of prongs attached thereto is disclosed in U.S. Pat. No. 2,572,378.

Although a number of different mechanisms for cracking nuts have been disclosed, there is still a problem with the removal of the meat from the nut after the initial cracking. Further, it is frequently difficult to apply selectively pressure to one particular point on a nut's shell to crack further that shell. No single device has solved these problems to permit an efficient nut cracking device.

Therefore it is an object of this invention to provide a nut cracker for the efficient cracking of nuts.

It is another object of this invention to provide a nut cracker which permits the cracking of the nut by use of an upper and lower jaw and also permits selective cracking of the nut by a nibbler.

It is a still further object of this invention to provide a novel nut cracker which permits the application of selective pressure against the nut shell being cracked by directing the pressure to one particular point on the nut shell.

These and other objectives and features of the present invention will become apparent to those skilled in the art from a consideration of the following detailed description, drawings and claims. The description along with the accompanying drawings provides a selected example of construction of the device to illustrate the invention.

SUMMARY OF INVENTION

In accordance with the present invention there is provided a combination nut cracker and nibbler comprised of an upper moveable jaw, a lower fixed jaw, a front pivot arm attached to the lower fixed jaw, a lever arm attached to both the pivot arm and the upper moveable jaw, a back arm secured to the lever arm and the lower fixed jaw and a nibbler mechanism secured to the upper moveable jaw to permit both the cracking of the nut shell between the jaws and the fixed, precise cracking of a portion of the nut shell for precise cracking of the nut.

BRIEF DESCRIPTION OF THE DRAWINGS

This invention will now be described with reference to the accompanying drawings in which.

DETAILED DESCRIPTION OF THE PREFERRED EMBODIMENT

Figure 1:
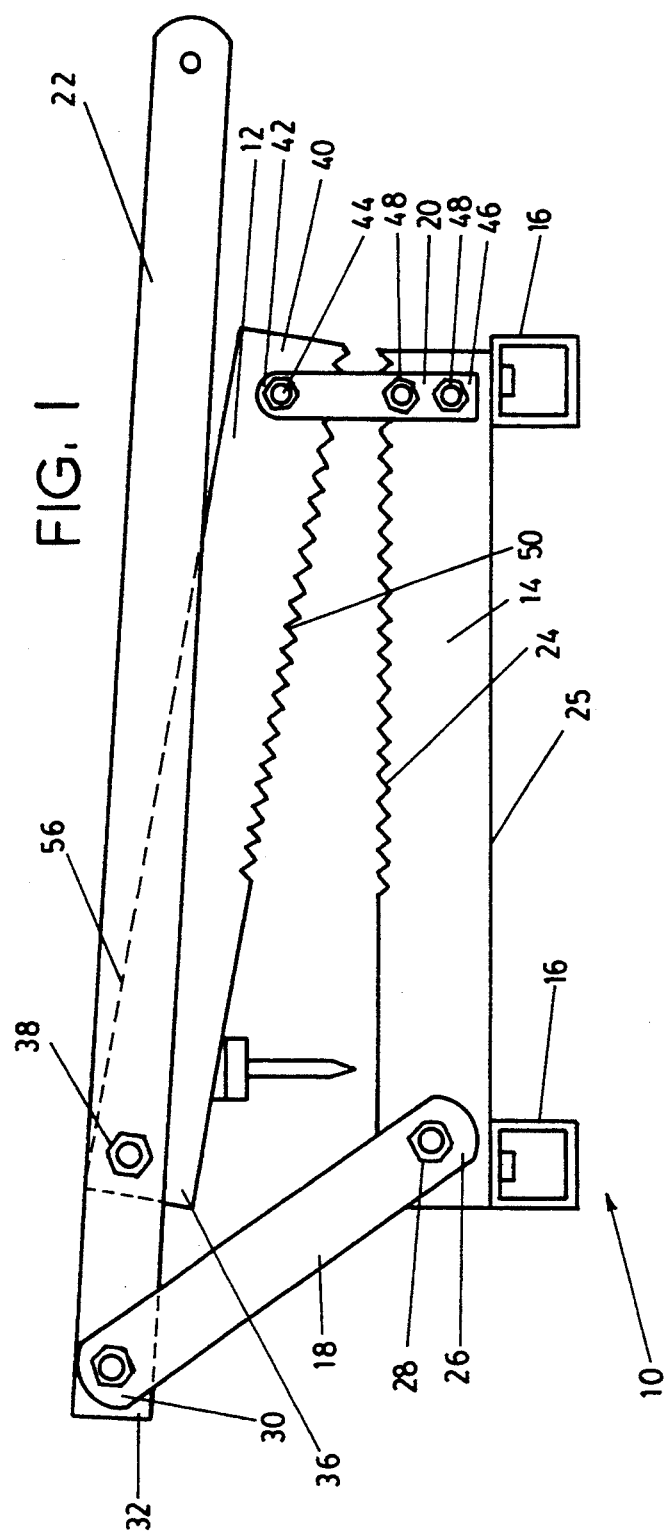
FIG. 1 is a side view of the combination nut cracker and nibbler.

Although the invention is adaptable to a wide variety of uses, it is shown in the drawings for purpose of illustration as embodied in a combination nut cracker and nibbler (10) comprised of a nut cracker portion and a nibbler portion. It is critical to the invention that both elements be present with the placement and arrangement of the nibbler within the device important to its overall function.

The nut cracker portion is comprised of an upper moveable jaw (12), a lower fixed jaw (14), a base portion (16), a front pivot arm (18), a back arm (20) and a lever arm (22). See FIG. 1. Each of these main elements are preferably produced from sturdy steel components with the thickness and strength of the individual component depending upon the size of the overall device. It is well understood that the combination nut cracker and nibbler (10) can be of small size, i.e., where the upper moveable jaw (12) and the lower fixed jaw (14) are no more than about 4 inches in length to much larger combination nut cracker and nibblers where the upper moveable jaw (12) and the lower fixed jaw (14) are a foot to even 18 inches in length.

The lower fixed jaw (14) contains a generally flattened upper surface (24) and can be made from a hollow steel bar. This upper surface (24) should be serrated for better gripping of the nuts. Alternatively, a separate lower gripping surface element (not shown) can be secured to the upper surface (24) of the lower fixed jaw. This lower gripping surface can be secured by any conventional securing means to the lower fixed jaw such as by welding or bolts. This lower gripping surface should also be roughened or serrated to provide a gripping surface for holding nuts securely in place while the device is in use.

Figure 3:
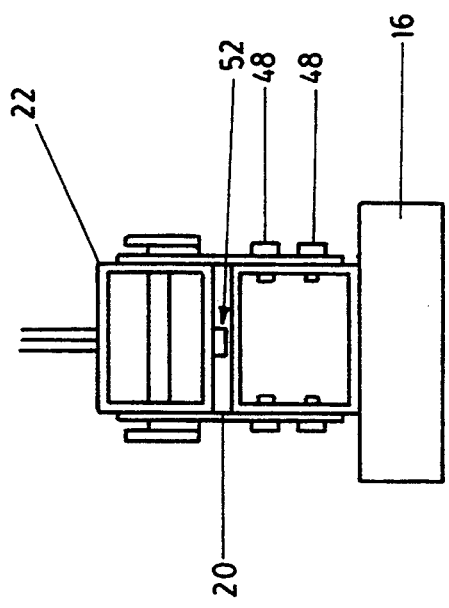
FIG. 3 is a rear view of the combination nut cracker and nibbler.
Figure 2:
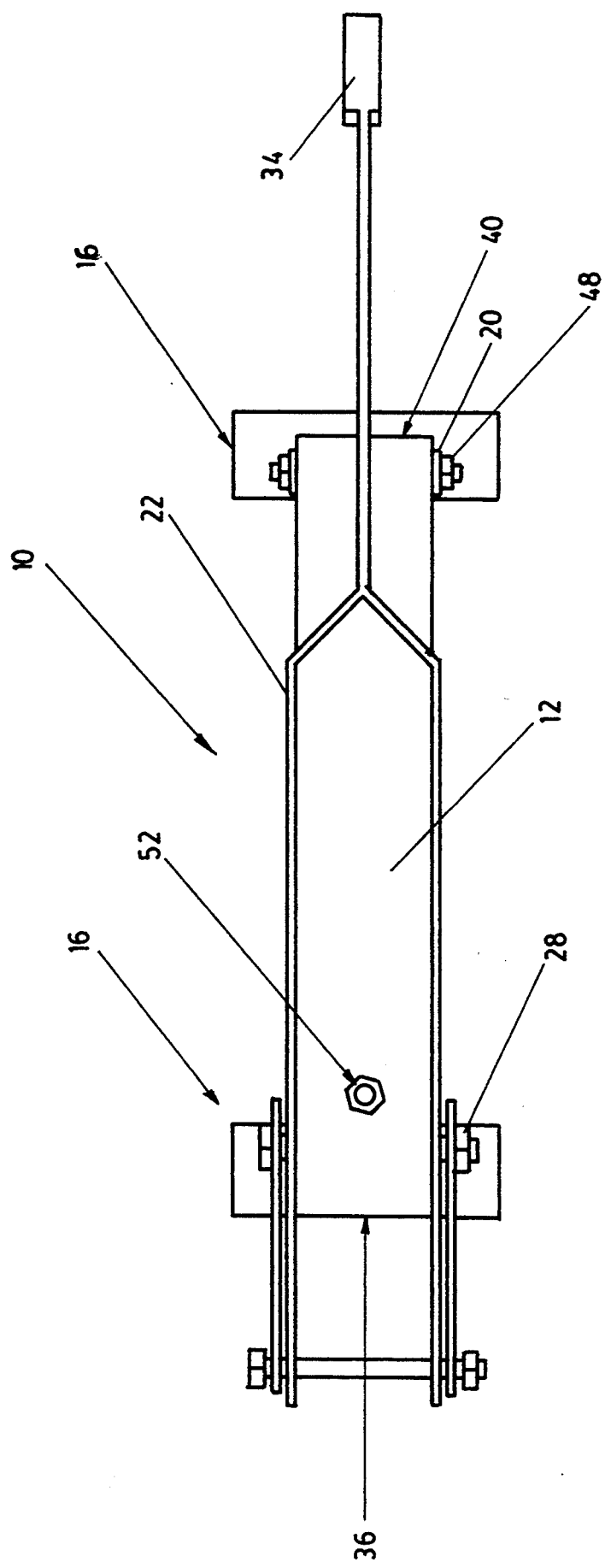
FIG. 2 is a top view of the combination nut cracker and nibbler.

Secured to the lower surface (25) of the lower fixed jaw is the base portion (16) of the device. See FIGS. 2 and 3. While a separate base is not required, preferably the base portion is secured to the lower surface (25) of the lower fixed jaw for better support of the overall device. For example, the base portion can be comprised of cross piece sections attached at either end of the lower surface (25) of the lower fixed jaw (14) to provide stability to the combination nut cracker and nibbler (10). These cross pieces should be at least one inch in length increasing in overall length depending on the overall size of the device. These cross pieces can be made of any material of sufficient strength to support the device and to hold it securely in place when the device is being used to crack nuts. In one preferred embodiment, these cross pieces are made from the same steel material as is the lower fixed jaw (14).

Secured to the distal end of the lower fixed jaw is the first end (26) of the front pivot arm (18). This first end (26) of the front pivot arm is secured to the lower fixed jaw (14) by any conventional securing mechanism such as a pin or bolt which passes through both the distal end of the lower fixed jaw and the first end (26) of the front pivot arm. The front pivot arm (18) is preferably comprised of two bars, one secured on each side of the lower fixed jaw (14). The securing mechanism for securing the lower fixed jaw (14) to the front pivot arm (18) must not be so fixed in securing as to prevent the front pivot arm (18) from pivoting freely about the securing element. In one preferred embodiment the securing element is a bolt (28) with securing nut. As the upper moveable jaw (12) moves up and down, the front pivot arm (18) pivots around its securing element to assist in the operation of the device.

The second end (30) of the front pivot arm is secured to the distal end (32) of the lever arm (22). It is secured in a manner similar to the method used securing the first end (26) of the front pivot arm (18) to the lower fixed jaw (14) such that the front pivot arm (18) can also pivot around the pivot point formed by the securing mechanism which secures the front pivot arm (18) to the lever arm (22). The lever arm can be formed of any conventional material but preferably is two steel bars which extend from its point of joining with the front pivot arm (18) back to where it forms a handle (34) for the combination nut cracker and nibbler (10). In one preferred embodiment, the two bars meet and are joined with a conventional wooden handle (34) for the device. See FIG. 2. The bars of the lever arm (22) are formed of the same type of high quality steel as are the front pivot arm (18) and the back arm (20).

The lever arm (22) is also secured to the upper moveable jaw (12) of the device. To achieve the greatest possible pressure on nuts being cracked and the easiest possible use of the device, the lever arm (22) is secured to the distal end (36) of the upper moveable jaw (12) at a fixed point (38) on the lever arm (22) close to where the front pivot arm (18) is secured to the lever arm (22) but proximal from that point. See FIG. 1. The mechanism for securing the lever arm (22) to the upper moveable jaw (12) is similar to the mechanism used for securing the front pivot arm (18) to the lever arm (22) and the front pivot arm (18) to the lower fixed jaw (14).

The upper moveable jaw (12) is also secured at its proximal end (40) to the first end (42) of the back arm (20). The upper moveable jaw (12) is secured to the first end (42) of the back arm (20) in such a way as to allow the upper moveable jaw to rotate around a pivot point (44) formed at this point of joining. The method for securing the upper moveable jaw (12) to the back arm (20) is the same as has previously been discussed.

The second end (46) of the back arm (20) is secured to the lower fixed jaw (14) in a manner different from that used with the other elements of the device. The second end (46) of the back arm (20) is secured to the lower fixed jaw (14) so that the back arm does not rotate about the fixed point where the two elements are secured together. This provides stability to the device to allow it to function as a nut cracker. The back arm (20) is preferably comprised of similar steel bars to those used with the other elements of the device. It is secured to the lower fixed jaw (14) by any conventional method which prevents rotation, such as a pair of pins or bolts (48) passing through both the second end (46) of the back arm and the proximal end of the lower fixed jaw.

Although the length of the various elements can be adjusted to fit the needs of the individual user, in a preferred embodiment, the front pivot arm (18) should be longer than the back arm (20). The distance when the jaws are closed between the distal end (36) of the upper moveable jaw (12) and the lower fixed jaw (14) in comparison to the distance between the proximal ends of the upper moveable jaw (40) and the lower fixed jaw (14) should also be greater. This provides better leverage for the cracking of the nuts. Preferably, this ratio of length between the front pivot arm (18) and the back arm (20) should be at least 1.2 to 1 and, preferably, about 1.5 to 1 or greater.

The upper moveable jaw (12) should be produced from the same materials as is the lower fixed jaw (14) and can be, for example, a hollow steel bar. It is also preferable that the lower surface (50) of the upper moveable jaw (12) be serrated to provide a gripping surface for gripping nuts to be cracked. If desired, an additional upper gripping surface element (not shown) can be secured to the lower surface (50) of the upper moveable jaw (12) to provide a better gripping surface for nuts to be cracked.

Figure 4:
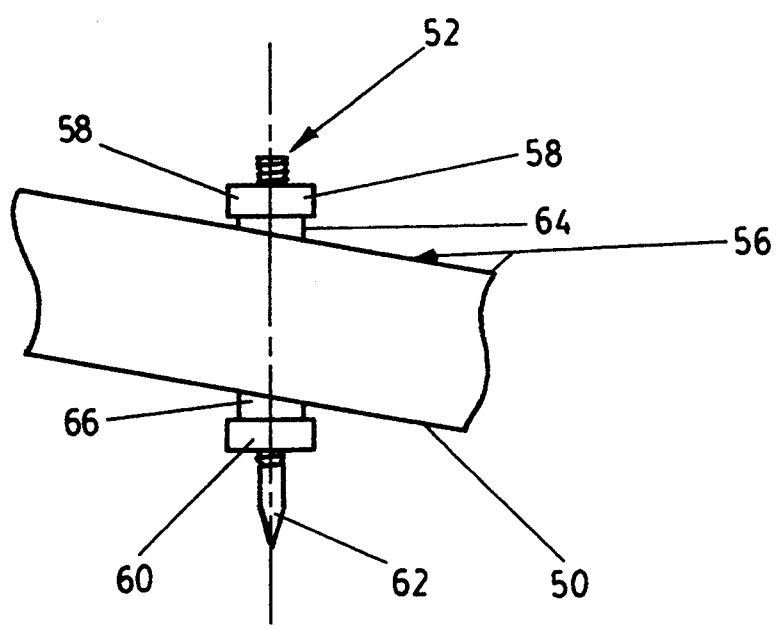
FIG. 4 is a side cut-away view of the nibbler portion of the combination nut cracker and nibbler.
Figure 5:
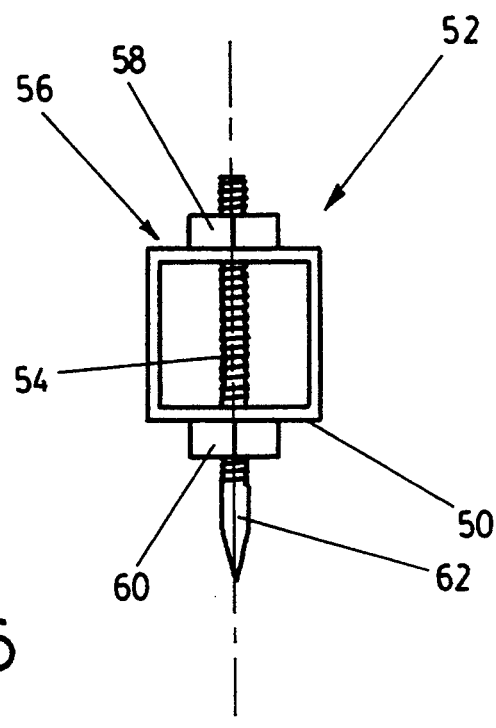
FIG. 5 is a front cut-away view of the nibbler portion of the combination nut cracker and nibbler.

The second major component of the device is the nibbler section (52). See FIGS. 4 and 5. The nibbler section is secured to the upper moveable jaw (12) closer to the distal end (36) than the proximal end (40) of the upper moveable jaw (12). It is secured to the upper moveable jaw at a point near where the upper moveable jaw (12) meets the lever arm (22) of the device.

Various means of attachment of the nibbler section (52) to the upper moveable jaw (12) can be conceived. In one preferred embodiment, the nibbler section (52) is comprised of a screw threaded shank (54) passing through both the upper surface (56) and the lower surface (50) of the upper moveable jaw, an upper elevation control nut (58) secured to the screw threaded shank (54) above the upper surface (56) of the upper moveable jaw, a lower elevational control nut (60) secured to the screw threaded. shank (54), located below the lower surface (50) of the upper moveable jaw and a sharpened tip section (62), an integral part of the screw threaded shank.

In one preferred embodiment the screw threaded shank passes through tapped and threaded openings in the upper moveable jaw. To hold the screw threaded shank securely in place and at the appropriate vertical angle, a wedge portion (64) can be secured on the threaded shank against the upper surface of the upper moveable jaw and onto that wedge (64) is secured on the upper elevation control nut (58). Below the lower surface (50) of the upper moveable jaw (12) where the screw threaded shank (54) projects may be secured a second wedge (66) and below that on the threaded shank (54) is secured the lower elevation control nut (60). Once these are securely attached, the tip section (62) of the screw threaded shank will be located a fixed height above the lower fixed jaw (14) when the lever arm (22) is at its lowest point. The height of the tip section (62) can be adjusted by movement of the threaded shank (54) up and down by adjustment of the upper (58) and lower (60) elevation control nuts and the upper and lower wedge portion (64, 66). Alternatively, a single adjustable nut (not shown) can be secured within the upper moveable jaw at a location where it can be accessed to adjust the height of the nibbler.

The screw threaded shank (54) with pointed tip section (64) should be constructed of high quality steel formed into either a point or a screwdriver-shaped head. The elevation control nuts and wedges are also formed from high quality steel to hold the nibbler firmly in place.

In operation, a nut to be cracked is placed on the upper surface (24) of the lower fixed jaw (14), if no separate lower gripping surface is used, with the lever arm (22) rotated to a position perpendicular to the lower fixed jaw (14). As the lever arm (22) is rotated toward a position parallel with the lower fixed jaw (14), the distal end (36) of the upper moveable jaw (12) also rotates downward by the lever operation of the front pivot arm (18) and the lever arm (22) until the upper moveable jaw (12) exerts pressure against the nut shell cracking such nut. The serrated or gripping surfaces (24, 50) of the upper moveable jaw and the lower fixed jaw securely hold the nut in place as it is being cracked.

If more precise cracking pressure is needed, the nut can be placed under the tip section (62) of the nibbler section (52), once again with the lever arm (22) in its vertical position. As the lever arm (22) is rotated toward its horizontal position, the tip section (62) of the screw threaded shank (54) descends to place precise pressure on any nut held under such nibbler section (52). This nibbler can be used after the nut has been first cracked by the action of the upper moveable jaw and the lower fixed jaw. The nibbler will thus permit more precise cracking of the nut to permit removal of sections of the shell of the nut without crushing the nut meat contained therein. The height of the screw threaded shank (54) can be adjusted by rotating it within the thread in the tapped portions of the upper moveable jaw by appropriate adjustments to the upper (58) and lower (60) elevation control nut and the wedge portions (64, 66). By this mechanism, additional precise force can be provided on a nut to crack it to permit access to usable meat from the nut.

What is claimed is:

1. A combination nut cracker and nibbler for difficult to crack nuts, comprised of
   (a) a lower fixed jaw,
   (b) a front pivot arm rotatably secured at a first end to a distal end of the lower fixed jaw,
   (c) a lever arm with a handle secured to a proximal end of said lever arm, wherein a distal end of the lever arm is pivotally secured to a second end of the front pivot arm,
   (d) a back arm secured at a first end to a proximal end of the lower fixed jaw,
   (e) an upper moveable jaw pivotally secured at its distal end to the lever arm and at its proximal end to a second end, the back arm, and
   (f) a nibbler section secured to the upper moveable jaw containing a screw threaded shank projecting downward from the upper moveable jaw.

2. The combination nut cracker and nibbler of claim 1 wherein there is secured to the lower fixed jaw a lower gripping surface.

3. The combination nut cracker and nibbler of claim 1 wherein there is secured to the lower surface of the upper moveable jaw a gripping surface.

4. The combination nut cracker and nibbler of claim 1 wherein the nibbler section is comprised of a screw threaded shank secured to the upper moveable jaw through a tapped and threaded section of the upper moveable jaw wherein there is also secured to the screw threaded shank upper and lower elevational control nuts.

5. The combination nut cracker and nibbler of claim 4 wherein there is also secured to the nibbler screw threaded shank an upper and a lower wedge for holding the screw threaded shank nibbler in place.

6. The combination nut cracker and nibbler of claim 1 wherein the front pivot arm is greater in length than the back arm at a ratio of at least about 1.2 to 1.

7. The combination nut cracker and nibbler of claim 1 wherein there is secured to a bottom surface of the lower fixed jaw a base portion.

8. The combination nut cracker and nibbler of claim 7 wherein the base portion is comprised of cross pieces that are secured to the bottom surface of the proximal and distal ends of the lower fixed jaw.

9. A combination nut cracker and nibbler for difficult to crack nuts comprised of
   (a) a lower fixed jaw,
   (b) a front pivot arm rotatably secured to the lower fixed jaw,
   (c) a lever arm secured to one end of the front pivot arm,
   (d) a back arm secured to the lower fixed jaw,
   (e) an upper moveable jaw pivotally secured at its distal end to the lever arm and at its proximal end to the back arm, and
   (f) a nibbler section secured to the upper moveable jaw containing a screw threaded shank projecting downward from the upper moveable jaw, wherein the nibble section is comprised of a screw threaded shank secured to the upper moveable jaw through a tapped and threaded section of the upper moveable jaw, wherein there is secured to the screw threaded shank upper and lower elevational control nuts, and wherein there is also secured to the nibbler screw threaded shank an upper and lower wedge for holding the nibbler screw threaded shank in place.

10. The combination nut cracker and nibbler of claim 9 wherein there is secured to the lower fixed jaw a lower gripping surface.

11. The combination nut cracker and nibbler of claim 9 wherein there is secured to a lower surface of the upper moveable jaw a gripping surface.

12. The combination nut cracker and nibbler of claim 9 wherein the front pivot arm is greater in length than the back arm at a ratio of at least about 1.2 to 1.

13. The combination nut cracker and nibbler of claim 9 wherein there is secured to a bottom surface of the lower fixed jaw a base portion.

14. The combination nut cracker and nibbler of claim 13 wherein the base portion is comprised of cross pieces that are secured to a bottom surface of the proximal and distal ends of the lower fixed jaw.

15. The combination nut cracker and nibbler of claim 9 wherein there is secured to the proximal end of the lever arm a handle.

* * * * *